US012377615B2

(12) United States Patent
Müller et al.

(10) Patent No.: US 12,377,615 B2
(45) Date of Patent: Aug. 5, 2025

(54) APPARATUS FOR MANUFACTURING FIBRE-REINFORCED COMPONENTS

(71) Applicant: ZF FRIEDRICHSHAFEN AG, Friedrichshafen (DE)

(72) Inventors: Ingolf Müller, Freimersheim (DE); Andre Stieglitz, Osnabrück (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 167 days.

(21) Appl. No.: 17/796,521

(22) PCT Filed: Dec. 21, 2020

(86) PCT No.: PCT/EP2020/087364
§ 371 (c)(1),
(2) Date: Jul. 29, 2022

(87) PCT Pub. No.: WO2021/151589
PCT Pub. Date: Aug. 5, 2021

(65) Prior Publication Data
US 2023/0347598 A1    Nov. 2, 2023

(30) Foreign Application Priority Data
Jan. 31, 2020   (DE) .................. 10 2020 201 188.5

(51) Int. Cl.
*B29C 70/38* (2006.01)
*B29C 70/32* (2006.01)

(52) U.S. Cl.
CPC ............ *B29C 70/32* (2013.01); *B29C 70/382* (2013.01)

(58) Field of Classification Search
CPC .................................................. B29C 70/382
See application file for complete search history.

(56) References Cited

U.S. PATENT DOCUMENTS 3,607,566 A * 9/1971 Medney ................ B29C 53/828
156/449
3,616,070 A * 10/1971 Lemelson ............... B29C 53/70
156/173
(Continued)

FOREIGN PATENT DOCUMENTS

DE    10 2017 222 479    12/2017
DE    10 2017 005 754    1/2018
(Continued)

OTHER PUBLICATIONS

Quanjin, Ma, et al. "Robotic filament winding technique (RFWT) in industrial application: A review of state of the art and future perspectives." Int. Res. J. Eng. Technol 5.12 (2018): 1668-1676.*
(Continued)

*Primary Examiner* — Jeffry H Aftergut
(74) *Attorney, Agent, or Firm* — COZEN O'CONNOR

(57) ABSTRACT

The invention is directed to an apparatus (10) for manufacturing fiber-reinforced component parts (1) according to a three-dimensional winding method, comprising at least one computer-controlled winding machine for winding filiform continuous fiber strands (12) provided on at least one spool (18) around at least one fiber carrier (11) arranged on a pivot pin (16) with at least one winding pattern. The at least one winding machine is constructed as a robot arm (13) which has a plurality of rotational axes and which lays down at least two fiber strands (12) simultaneously. The at least one robot arm (13) is adapted to simultaneously lay down the at least two fiber strands (12) so as to be distributed to at least two fiber carriers (11) arranged, respectively, on a separate pivot pin (16) and/or to simultaneously lay down the at least two fiber strands (12) on only one fiber carrier (1) arranged on a separate pivot pin (16).

15 Claims, 8 Drawing Sheets

(56) References Cited

U.S. PATENT DOCUMENTS

| | | | | |
|---|---|---|---|---|
| 4,750,960 | A | * | 6/1988 | Bubeck ............... B65H 71/007 |
| | | | | 156/169 |
| 4,757,681 | A | * | 7/1988 | Matsuno ................ F16G 13/06 |
| | | | | 59/5 |
| 6,096,164 | A | | 8/2000 | Benson |
| 7,467,782 | B2 | | 12/2008 | Harvey et al. |
| 2006/0180264 | A1 | | 8/2006 | Kisch et al. |
| 2018/0222129 | A1 | | 8/2018 | Gaffiero et al. |

FOREIGN PATENT DOCUMENTS

| | | | |
|---|---|---|---|
| WO | WO 01/64570 | | 9/2001 |
| WO | WO-01/64570 A1 | * | 9/2001 |
| WO | WO 2017/202614 | | 11/2017 |
| WO | WO-2017/202614 A1 | * | 11/2017 |
| WO | WO 2019/115146 | | 6/2019 |
| WO | WO-2019/115146 A1 | * | 6/2019 |

OTHER PUBLICATIONS

International Search Report issued in corresponding PCT Application PCT/EP2020/087364.
German Search Report dated Sep. 4, 2020 issued in corresponding application No. 10 2020 201 188.5.
Roth Composite Machinery GmbH—Press release Sep. 26, 2018.
Search Report dated Sep. 4, 2020 issued in German Patent Application No. 102020201188.5.
Roth Composite Machinery GmbH "Roth Composite Machinery Completes its Range of Products with Robot Winding Processes", Press Release, Sep. 26, 2018, 4 pages.

* cited by examiner

APPARATUS FOR MANUFACTURING FIBRE-REINFORCED COMPONENTS

CROSS REFERENCE TO RELATED APPLICATIONS

This is a U.S. national stage of International application No. PCT/EP2020/087364, filed on Dec. 21, 2020, which claims priority to German Application No. 10 2020 201 188.5, filed Jan. 31, 2020, the content of each of which is incorporated herein by reference.

BACKGROUND OF THE INVENTION

1. Field of the Invention

The present invention is directed to an apparatus for manufacturing fiber-reinforced component parts according to a three-dimensional winding method.

2. Description of the Prior Art

A device for manufacturing fiber-reinforced component parts according to a three-dimensional winding method and a method for producing winding patterns on a fiber carrier are known from DE 10 2017 222 479 A1. Thus DE 10 2017 222 479 A1 describes a robot by which a filament comprising a fiber-reinforced composite material is wound onto a mandrel in order to form the component part. The mandrel is received on the robot arm and is guided by the robot arm while the filament is wound on, or the mandrel is received on a spindle, the filament being guided by a robot arm in order to wrap the filament around the mandrel.

DE 10 2017 005 754 A1 describes an installation for manufacturing fiber-reinforced component parts according to a three-dimensional winding method. The winding machine, which is moveable in three dimensions, is centrally positioned in an annular cage, a plurality of rotatable plate-shaped carrier elements being attached from the outside along a circumference of the cage for loading with a fiber carrier. The fiber carriers face the winding machine after being loaded. A spool is attached to the continuous fiber strand on the winding machine. A head of the winding machine is formed to guide the continuous fiber strand and to wind the continuous fiber strand around the fiber carrier in three dimensions. The fiber carriers are wrapped successively corresponding to the annular arrangement of the carrier elements loaded with the fiber carriers.

SUMMARY OF THE INVENTION

Proceeding from the prior art described above, it is an object of the present invention to have an apparatus for manufacturing fiber-reinforced component parts according to a three-dimensional winding method and a method for generating winding patterns on a fiber carrier such that they are characterized by a higher efficiency during the manufacture of fiber-reinforced component parts.

According to an aspect of the present invention, an apparatus for manufacturing fiber-reinforced component parts according to a three-dimensional winding method is proposed. The apparatus comprises at least one computer-controlled winding machine for winding filiform continuous fiber strands provided on at least one spool around a fiber carrier arranged on a pivot pin with at least one winding pattern. According to an aspect of the invention, the at least one winding machine is constructed as a robot arm having a plurality of rotational axes and laying down at least two fiber strands simultaneously. The at least one robot arm is adapted, i.e., configured, to simultaneously lay down the at least two fiber strands so as to be distributed to at least two fiber carriers arranged, respectively, on a separate pivot pin and/or to simultaneously lay down the at least two fiber strands on only one fiber carrier arranged on a separate pivot pin. In particular, the at least one winding machine is constructed as a robot arm having six rotational axes. In particular, the respective pivot pin forms a seventh axis of the apparatus, around which the respective fiber carrier rotates during the laydown of filament. In this way, the quantity of component parts which can be manufactured simultaneously can be increased and the manufacturing time for an individual component part can be reduced. In particular, by combining parallel wrapping of two or more fiber carriers with simultaneous parallelized laydown of two or more fiber strands on the respective fiber carrier, a multiplication of the manufacturing speed can be achieved. The manufacturing process is parallelized in multiple dimensions so that the manufacturing speed, as product of the quantity M of fiber carriers and the quantity N of fiber strands to be laid down, can be increased.

According to an aspect of the invention, the apparatus can have at least one device for maintaining a specifiable fiber strand tension independent from the feed direction of the respective fiber strand between the spool and the fiber carrier. By the device, the specifiable fiber strand tension of the respective fiber strand can be maintained both when unspooling, i.e., feeding the respective fiber strand, and when re-spooling, i.e., winding back up when too much of the fiber strand has been taken off.

For this purpose, the at least one device can comprise at least one electronically controlled synchronous motor which drives the spool. Synchronous motors are advantageously suitable for applications in which a load-independent, stable speed is required, as is the case when maintaining the fiber strand tension. Further, a synchronous motor enables a compact and efficient construction of the device for maintaining the fiber strand tension, which is reflected in the total weight of the at least one device. Each spool is driven by an electronically controlled synchronous motor.

In particular, the at least one device can comprise at least one sensor for detecting the fiber strand tension and at least one computer for controlling the at least one synchronous motor depending on the detected fiber strand tension. The at least one sensor preferably operates in a non-contacting manner in order to minimize the influence on the fiber strand tension to be detected.

According to a preferred aspect, the at least one device for maintaining the fiber strand tension can be connected to a receiver configured to receive at least one spool. At least one spool carrying the fiber strand to be wound off can be arranged on the receiver. The spool is preferably connected to the synchronous motor by frictional engagement. Particularly preferably, two or more spools can be arranged on the receiver, these spools being connected, respectively, to the respective driving synchronous motor by frictional engagement. The quantity of fiber-reinforced component parts to be manufactured simultaneously can be correspondingly increased in this manner. The control of the synchronous motors at the receiver can be carried out by a shared computer. Alternatively, each of the synchronous motors can be controlled by a separate computer.

In particular, the at least one spool can be arranged at a distance from the at least one robot arm. This arrangement has the advantage that the at least one spool, which is arranged to be spaced apart from the robot arm, does not form an added mass to be supported by the robot arm. With external material storage, the robot arm merely supports a laydown unit with which the fiber strand is guided when wrapping around and laying down on the fiber carrier. Along with the at least one spool, the at least one device for maintaining the fiber strand tension with the receiver configured to receive the at least one spool is also correspondingly arranged to be spaced apart from the robot arm.

According to an alternative construction, the at least one spool can be arranged at the at least one robot arm. This arrangement has the advantage that the free length of filament, i.e., the distance between spool and fiber carrier, is kept small, and higher movement speeds of the robot arm are made possible. In this regard, the at least one device for maintaining the fiber strand tension and the at least one spool are carried along directly on the robot head, i.e., the free end of the robot arm.

According to a further alternative construction, the pivot pin on which the fiber carrier is arranged can be arranged at the robot arm. According to this arrangement, an external material storage is provided, and the at least one device for maintaining the fiber strand tension with the receiver, in addition to the at least one spool, is also correspondingly arranged to be spaced apart from the robot arm.

In particular, at least one filament eye can be arranged at the at least one robot arm for a substantially frictionless feed of the respective fiber strand. This is significant in regard to the feed of the fiber strand because the fiber strand is a filiform pre-impregnated semi-finished product, for example, a tow-preg semi-finished product, yarn-preg semi-finished product, uni-tape semi-finished product, or pre-preg semi-finished product. A pre-impregnated semi-finished product is used because winding speeds higher by up to a factor of 10 as compared with customary wet winding methods can be realized. Owing to the tackiness of the pre-impregnated fiber strand, the use of the three-dimensional winding method and the rotation of the component part around an axis of rotation, curved winding paths can be produced outside of the geodesic lines of the component part.

According to a preferred further aspect, at least two fiber carriers can be arranged substantially parallel to one another on separate pivot pins. A pivot mounting comprising at least two driven pivot pins on which a fiber carrier is arranged in each instance can be provided for this purpose. A plurality of parallel, identically controlled pivot pins can be operated, a fiber carrier being arranged at each of the latter such that it can rotate around its winding axis. All of the parallel pivot pins rotate synchronously or virtually synchronously so that all of the pivot pins on the pivot mounting are activated simultaneously with one control command. For control of the respective synchronous motor, the receiver carrying the spools has, in each instance, a device for maintaining the fiber strand tension.

Provided that a smooth synchronous running of the winding axes is adjusted and the influence of extraneous disturbances, such as, for example, geometrical deviations of the component parts to be manufactured or equal unspooling state, i.e., diameters of the spools, etc., is limited, a simplified arrangement can be realized in which the receiver supporting the spools is used with only one device for maintaining the fiber strand tension for the spools. The synchronous motors can be controlled by exactly one device for maintaining the fiber strand tension.

A configuration of the apparatus for manufacturing fiber-reinforced component parts with a combination of spool arrangement and fiber carrier arrangement is particularly advantageous. For example, the spool arrangement can be provided such that a plurality of spools are arranged on a receiver in a matrix-like manner, i.e., at least two spools adjacent to one another in a row and at least two spools one above the other in a column, fiber strands being taken off in a parallelized manner from each of the spools arranged in a row. The fiber carrier arrangement can have at least two fiber carriers to be wrapped which are arranged on at least two pivot pins arranged parallel to one another. The respective parallelized fiber strands are fed to the respective fiber carrier from the respective spools arranged in a row. A multidimensional parallelization of the manufacturing process can be achieved in this way so that the manufacturing speed can be increased in the dimension of the product of fiber carrier quantity and fiber strand quantity.

In particular, two robot arms can be arranged opposite one another, which robot arms are configured for inverse laydown of at least one fiber strand, respectively, on a fiber carrier arranged between the robot arms on a pivot pin. By "inverse laydown" it is meant a simultaneous mirror-inverted or oppositely directed laying down of a respective fiber strand on the one fiber carrier arranged on the pivot pin with respect to the symmetry axis. The symmetry axis of the fiber carrier should coincide with the pivot pin. in order to increase efficiency, the two robot arms arranged opposite one another can be adapted for inverse laydown of two or more fiber strands, respectively, on the fiber carrier arranged between the robot arms on the pivot pin.

Further, it is conceivable that two fiber carriers can be arranged adjacent to one another on a common pivot pin. In this regard, at least two parallelized fiber strands can be laid down, respectively, so as to be distributed on two fiber carriers arranged between the robot arms on a pivot pin.

The above-stated object is further met by a method for generating winding patterns on a fiber carrier with the above-mentioned apparatus in which an even multiple of parallelized fiber strands, but at least two fiber strands, are wound onto at least one fiber carrier by the apparatus.

For this purpose, it can be provided that a specifiable fiber strand tension is maintained during the winding process independent from the fiber feed direction of a fiber strand between spool and fiber carrier. By the device for maintaining the fiber strand tension, the specifiable fiber strand tension of the respective fiber strand can be maintained both when unspooling, i.e., feeding the respective fiber strand, and when re-spooling, i.e., winding back up when too much of the fiber strand has been taken off. For this purpose, the at least one device can comprise at least one electronically controlled synchronous motor which drives a spool from which the fiber strand is taken off. In order to control the at least one synchronous motor, the fiber strand tension is detected by a sensor and is evaluated by a computer of the at least one device to control the synchronous motor in dependence upon the fiber strand tension.

In particular, two rotational axes of the at least one robot arm having a plurality of rotational axes can be so controlled during a parallelized laydown of fiber strands in a distributed manner on fiber carriers arranged parallel to one another that they are operated with a constant angle during the entire winding process. In this regard, two or more fiber strands which are wrapped around the fiber carriers arranged parallel to one another are taken off from spools which are arranged parallel to one another on a receiver. In order to ensure that all of the fiber strands taken from the spools run exactly parallel in each instance and have the same length or the same distance between the fiber carrier and the respective spool and arrive at the same point on the fiber carriers, the kinematics of the robot arm are limited. In particular, the at least one robot arm has six rotational axes.

In particular, fiber-reinforced component parts for chassis of vehicles can be manufactured by the apparatus according to the invention and the method according to the invention. In particular, component parts with a clear load flow which is as constant as possible can be manufactured by the apparatus and the method, wherein the load flow is limited to a few dominant load directions. For example, all kinds of multipoint links, two-point links, three-point links, four-point links or five-point links can be realized by this method. Functional component parts have a very low mass but have high strength values and stiffness values at the same time.

BRIEF DESCRIPTION OF THE DRAWINGS

The drawings show advantageous embodiment forms of the invention which will be described in more detail in the following. In the drawings.

DETAILED DESCRIPTION OF THE PRESENTLY PREFERRED EMBODIMENTS

Figure 1:
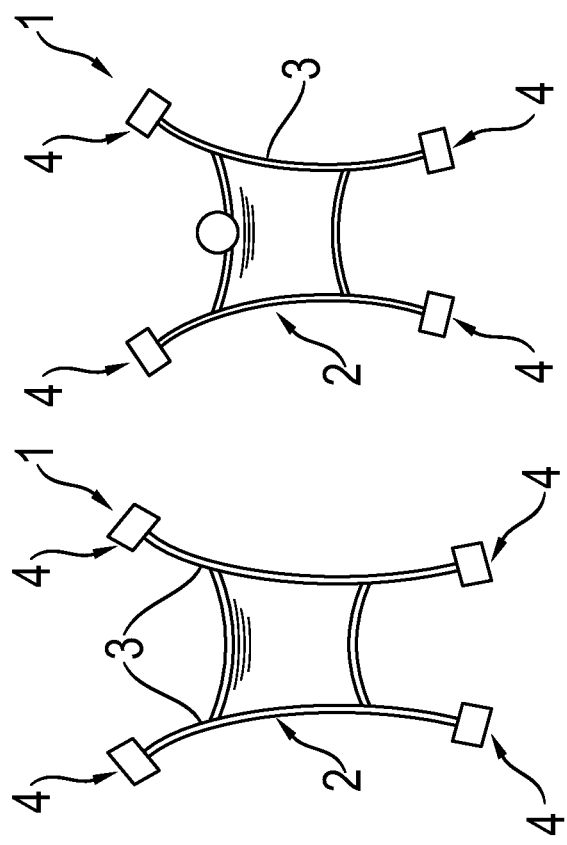
FIGS. 1A-1E are schematic views of fiber-reinforced component parts constructed as multipoint links.

In the following, like reference numerals are used for identical or functionally like component parts or components.

Schematic views of fiber-reinforced component parts 1 constructed as multipoint links are shown in FIGS. 1A to 1E. FIG. 1A shows a structural component part 1 of a chassis which is constructed as a two-point link. The chassis structural component part 1 comprises a body 2 having at least two load introduction regions 4 which are connected to one another by a connection structure 3. The connection structure 3 of the body 2 may be constructed in particular so as to have a hollow profile. The body 2 substantially determines the basic shape of the vehicle structural component part 1. Two exemplary variants of a chassis structural component part 1 constructed as a three-point link are shown in FIGS. 1B and 1C. An exemplary chassis structural component part 1 constructed as a four-point link or as a five-point link is shown in FIGS. 1D and 1E. Chassis structural component parts 1 constructed as multipoint links can connect kinematic points in a chassis and/or in a wheel suspension and transmit motion and/or forces. The connection of the multipoint link to further component parts of the chassis can be realized by joints which are arranged in the load introduction regions 4. Owing to their symmetry of shape and the arrangement of the load introduction regions 4, these structural component parts 1 have a definite, substantially constant load flow which is limited to a few dominant load directions. Manufacturing such structural component parts 1 as fiber-reinforced component parts by a three-dimensional winding method makes it possible to produce functional component parts having a low mass but high strength values and stiffness values at the same time.

Various embodiment forms of an apparatus 10 for manufacturing such fiber-reinforced component parts 1 according to a three-dimensional winding method and a method for generating winding patterns on a fiber carrier 11 with such an apparatus 10 are described in the following.

Figure 2:
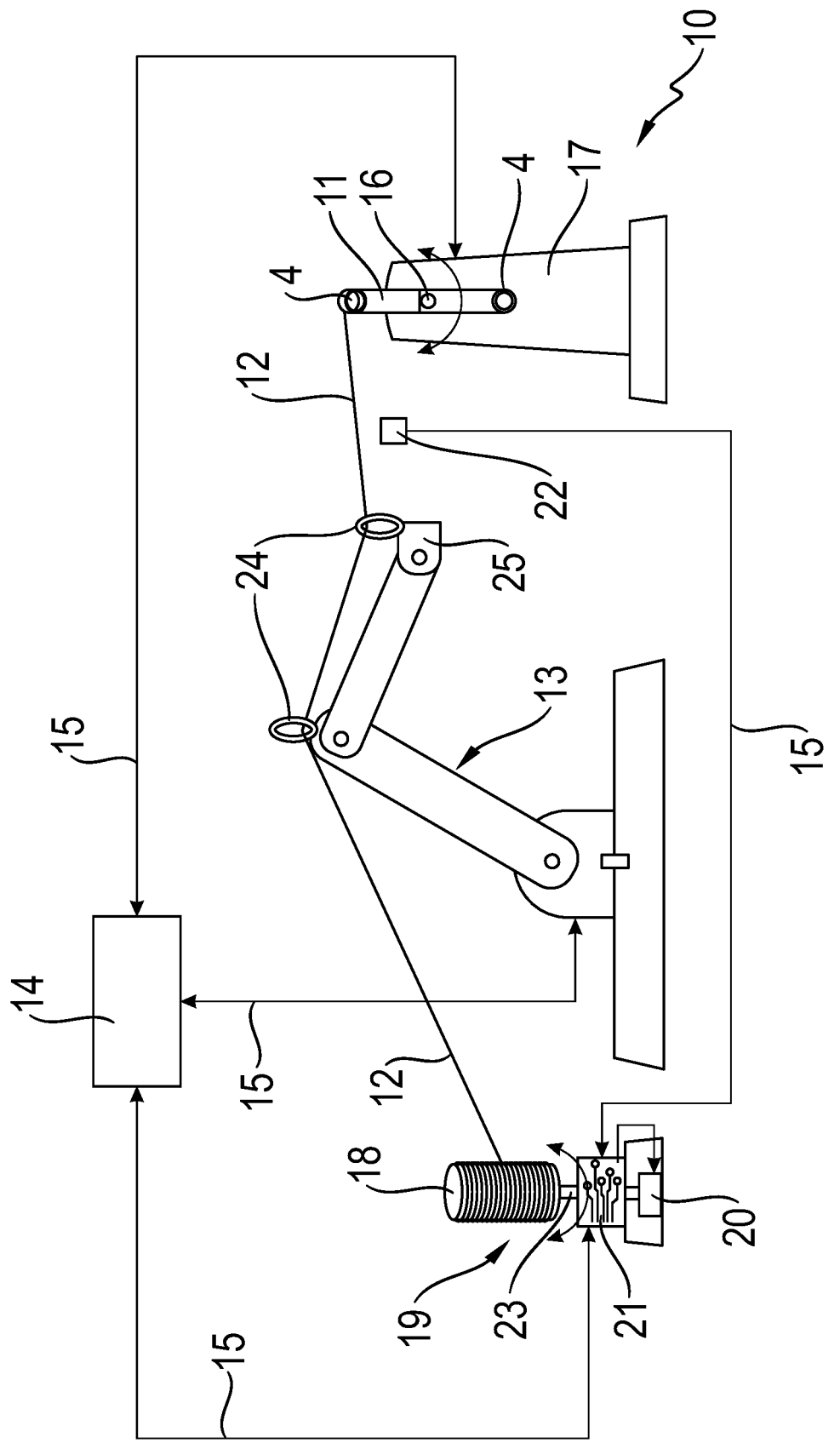
FIG. 2 schematically shows an apparatus for manufacturing fiber-reinforced component parts according to a three-dimensional winding method.

An apparatus 10 for manufacturing fiber-reinforced component parts 1 according to a three-dimensional winding method is shown schematically in FIG. 2. The fiber carrier 11 forms a core element of the component part 1. The fiber carrier 11 comprises a foamed material around which is wound at least one filiform continuous fiber strand 12, hereinafter referred to as fiber strand, comprising a fiber-reinforced plastic composite material. The fiber carrier 11 substantially predetermines the contour of the structural component part to be produced but without exercising a supporting function. The diagram shows the fiber carrier 11 with joint elements already arranged on it in the load introduction regions 4. Laydown is carried out in the form of one or more winding patterns, each winding pattern having a particular function associated with it to influence one or more mechanical characteristics of the structural component part 1.

The apparatus 10 comprises at least one computer-controlled winding machine which is constructed as a robot arm 13 having six rotational axes. A controller 14 is provided for controlling the at least one robot arm 13. The controller 14 communicates with the robot arm 13 through a signal line or a bus system 15. The fiber carrier 11 on which the at least one fiber strand 12 is wound with at least one winding pattern which is specifiable by the controller 14 is arranged on a driven pivot pin 16 of a pivot mounting 17. The drive of the pivot pin 16 can likewise be controlled by the controller 14 via the bus system 15. The pivot pin 16 of the pivot mounting forms a seventh rotational axis of the apparatus 10. The at least one fiber strand 12 is provided on at least one spool 18. The spool 18 is arranged to be spaced apart from the robot arm 13.

The apparatus 10 further comprises at least one device 19 for maintaining a specifiable fiber strand tension. The respective device 19 comprises a drive motor, a computer 21 and at least one sensor 22 for detecting the fiber strand tension. The spool 18 is arranged on a spindle 23 so as to be fixed with respect to rotation relative to it. The spindle 23 is driven by the drive motor which is constructed as an electronically controlled synchronous motor 20. The fiber strand 12 which is drawn off from the spool 18 is fed to the fiber carrier 11 substantially without friction through the filament eyes 24 arranged at the robot arm 13. There is at least one sensor 22 along the free path of the at least one fiber strand 12 between the unspooling point on the spool 18 and the laydown point on the fiber carrier 11 for monitoring the fiber strand tension.

The computer 21 is adapted to evaluate the signals of the at least one sensor 22 and to control the at least one synchronous motor 20 depending on the detected fiber strand tension. The control of the at least one synchronous motor 20 by the computer 21 allows specifiable fiber strand tension to be maintained. This is necessary in order to prevent lengthening or shortening of the fiber strand 12 brought about by the movement of the robot arm 13. For this purpose, the controller 14 of the robot arm 13 can be connected to the computer 21 by the bus system 15 in order to send the movement profile of the robot arm 13 having six rotational axes to the computer 21. The precision with which the fiber strand tension is maintained through the control of the synchronous motor 20 can be increased in this way. The spool 18 driven by the synchronous motor 22 can be operated such that it is possible for the fiber strand 12 to be alternately unspooled and re-spooled by changing the rotational direction.

Figure 3:
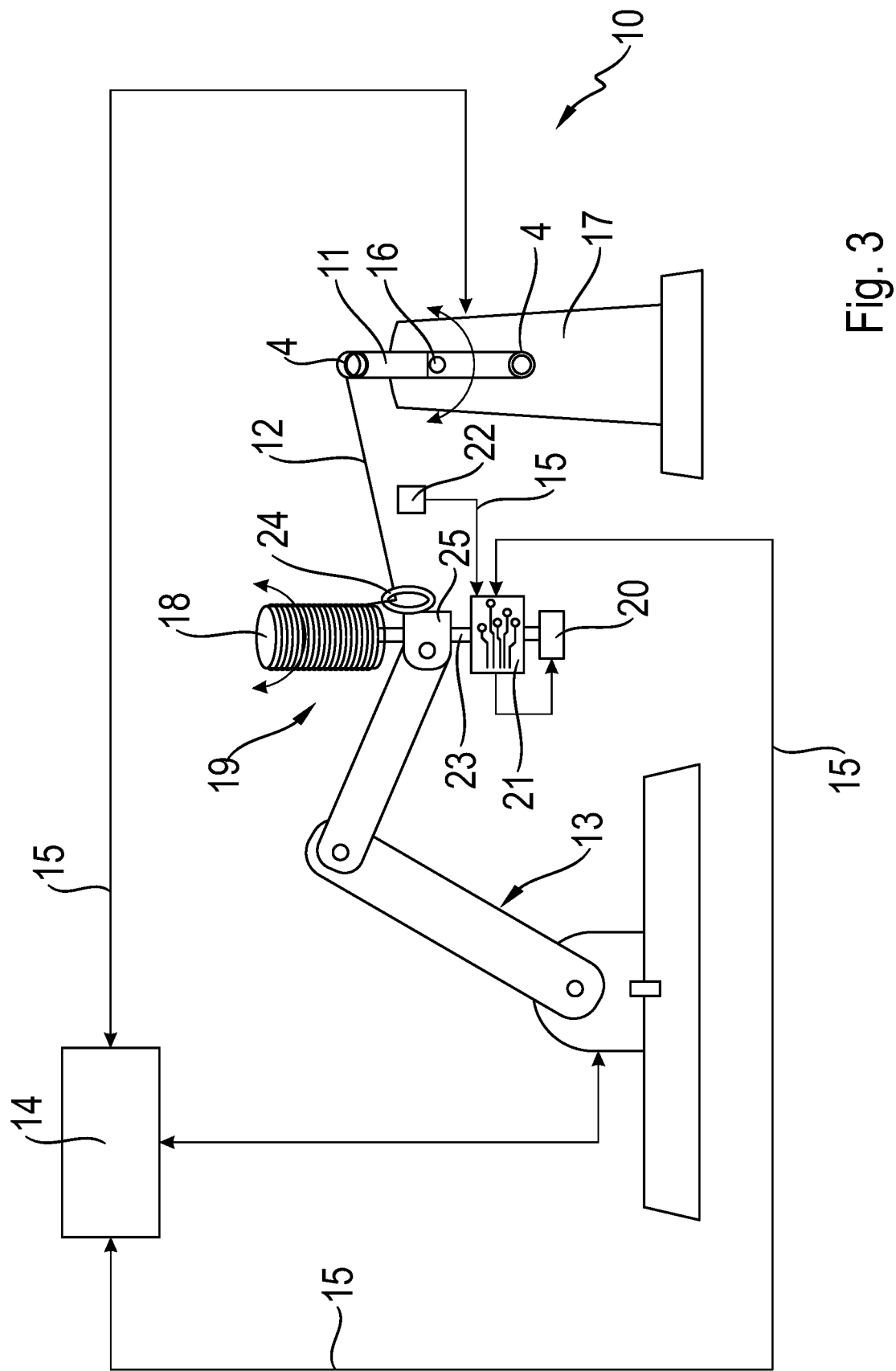
FIG. 3 schematically shows a further embodiment form of an apparatus according to FIG. 2.

FIG. 3 shows a schematic diagram of a further embodiment of the apparatus 10 according to FIG. 2. This embodiment form of the apparatus 10 differs from that described above in the divergent positioning of the at least one spool 18 and the device 19 for maintaining the specifiable fiber strand tension of the at least one fiber strand 12. The spool 18 and the device 19 are arranged at the head 25 of the robot arm 13 and are carried along by the latter. The advantage of this arrangement consists in the shorter free path length of the fiber strand 12 so that the control of the synchronous motor 20 is facilitated. In addition, the movement speed of the robot arm 13 can be increased in this way.

Figure 4:
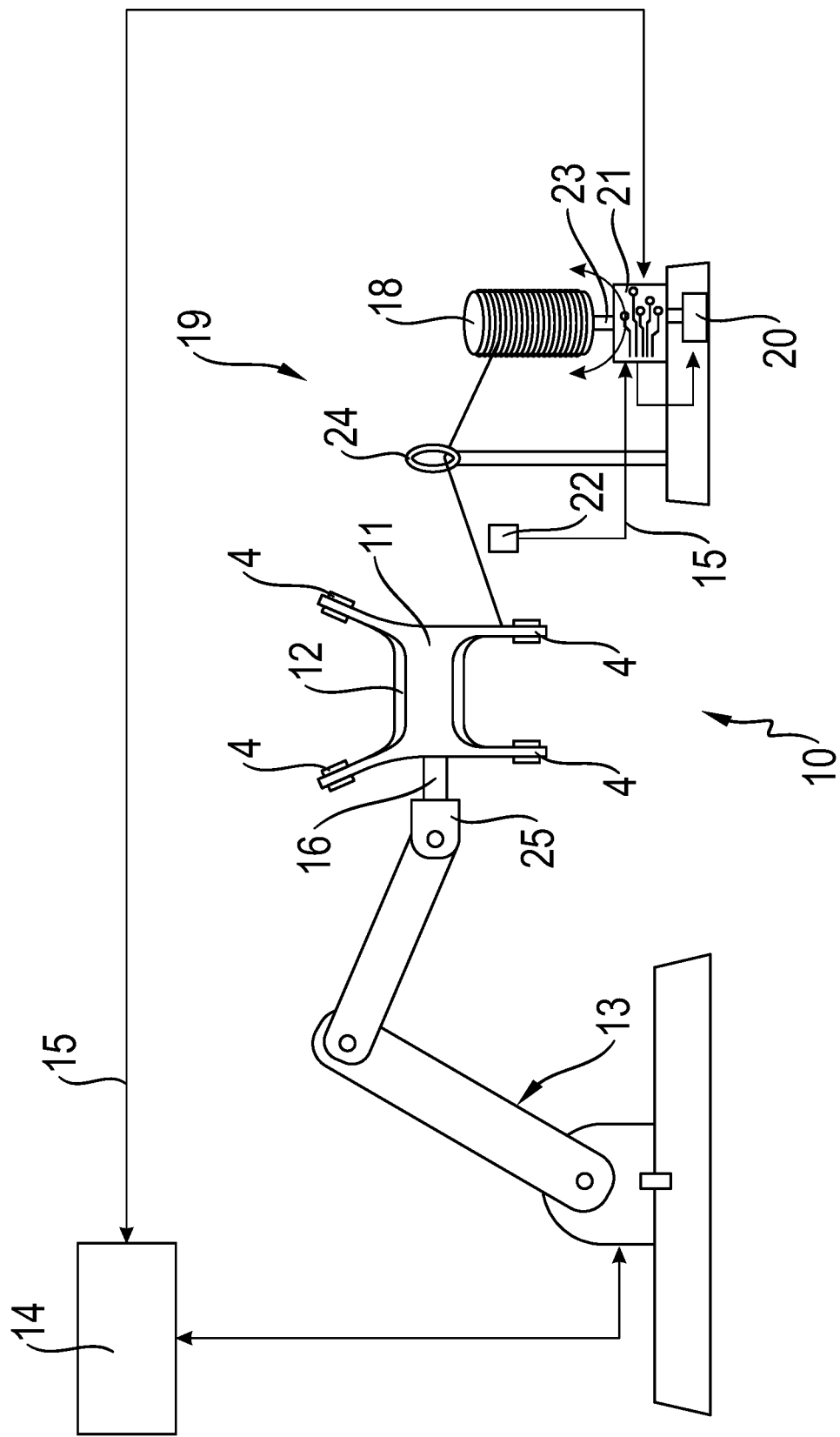
FIG. 4 schematically shows a third embodiment form of an apparatus according to FIG. 2.

FIG. 4 schematically shows a third embodiment form of the apparatus 10 according to FIG. 2. In contrast to the embodiment forms of the apparatus 10 described above, the pivot pin 16 on which the at least one fiber carrier 12 is rotatably arranged is arranged at the head 25 of the robot arm 13. The spool 18 and the device 19 for maintaining the fiber strand tension are arranged spaced apart from the robot arm 13.

Whereas in the embodiment forms according to FIGS. 2 and 3, the at least one fiber strand 12 is guided by the robot arm 13 and the at least one fiber carrier 11 to be wrapped is arranged on at least one driven pivot pin 16 of the pivot mounting, the fiber carrier 11 according to this third embodiment form shown in FIG. 4 is guided by the robot arm 13.

Figure 5:
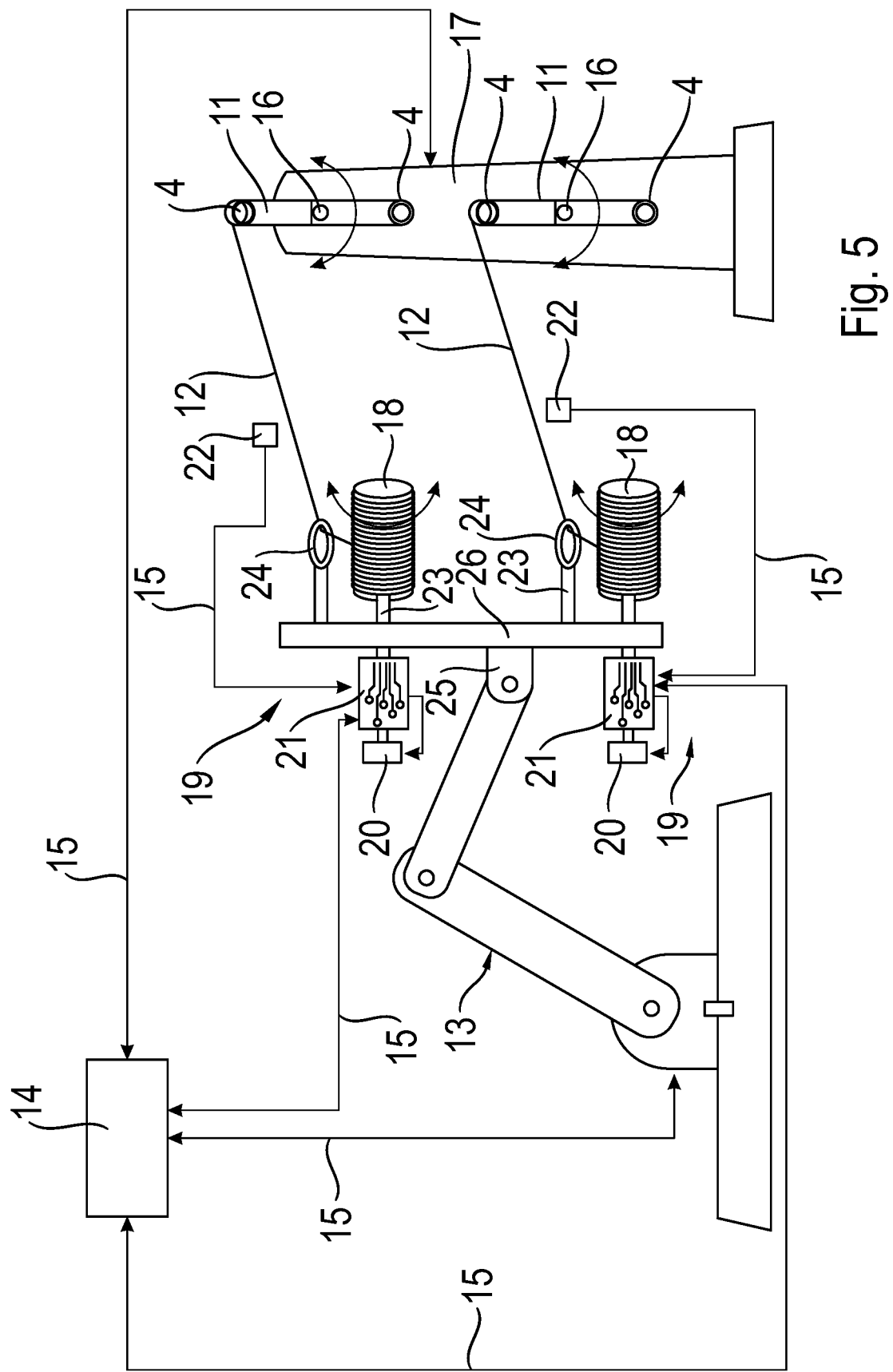
FIG. 5 schematically shows an apparatus for parallelized laydown of two fiber strands on two fiber carriers.

FIG. 5 schematically shows the apparatus 10 for the parallelized laydown of two fiber strands 12 on two fiber carriers 11. As a result of a parallelized laydown of fiber strands on a plurality of parallel oriented fiber carriers 11 M number of times, increased efficiency of the method for generating winding patterns on the fiber carriers 11 and, accordingly, of the manufacturing of the component parts 1 is achieved. In this regard, the apparatus 10 is based on the embodiment form described with reference to FIG. 3. A receiver 26 for receiving two or more spools 18 vertically one above the other is arranged at the head 25 of the robot arm 13. Depending on the quantity of spools 18, two or more devices 19 for maintaining the fiber strand tension are connected to the receiver 26 as has already been explained. Each device 19 serves to maintain the fiber strand tension of the respective fiber strand 12 drawn off from a spool 18. Depending on the quantity of spools 18 which are arranged one above the other in a column-like manner, the pivot mounting 17 comprises two or more driven pivot pins 16 on which a fiber carrier 11 is arranged in each instance. The controller 14 so controls the drives of the pivot pins 16 which form the seventh rotational axis of the apparatus 10 that the pivot pins 16 of the pivot mounting which are parallel to one another are similarly operated. The computers 21 of the devices 19 control the synchronous motors 20 driving the spindles 23 such that the fiber strand feed process of the spools 18 which are received by the receiver 26 in a parallel manner likewise proceeds similarly. All of the pivot pins 16 or spindles 23, respectively, which are oriented parallel to one another can preferably rotate synchronously so that all of the pivot pins 16 or spindles 23, respectively, can be simultaneously activated by a control command.

Figure 6:
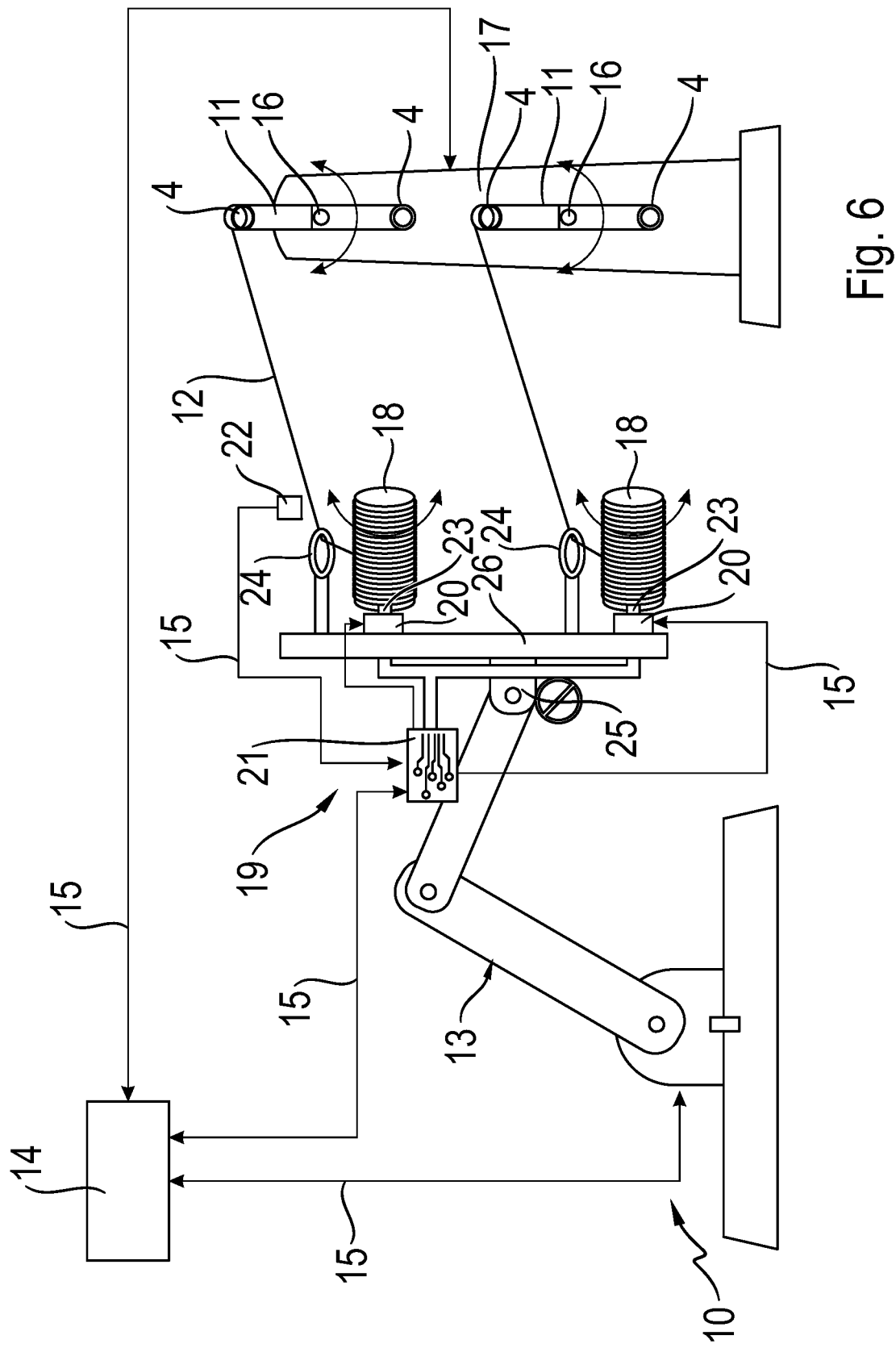
FIG. 6 schematically shows a further development of the apparatus according to FIG. 5.

The diagram in FIG. 6 schematically shows a further development of the apparatus 10 according to FIG. 5. In this regard, a simplified construction of the apparatus 10 can be achieved when a smooth running of the pivot pins 16 can be brought about by suitable control during the fiber strand feed. Further, a limiting of the influence of external interferences such as, for example, geometric deviations, substantially identical unspooling state, i.e., substantially identical diameter of the spools 18, and the like, should be achieved in the implementation of this further development of the apparatus 10. Taking into account at least one of these prerequisites, a simplified construction of the apparatus 10 can consist in that this apparatus 10 can be operated with only one device 19 but with two or more synchronous motors 20 for driving the spools 18.

With the apparatuses 10 shown in FIGS. 5 and 6, it is possible to carry out a parallel manufacture of a plurality of component parts 1 in a quantity M with only one robot arm 13 in the same total manufacturing time. The manufacturing time for each component part 1 can be reduced to the Mth part of the total time.

Figure 7:
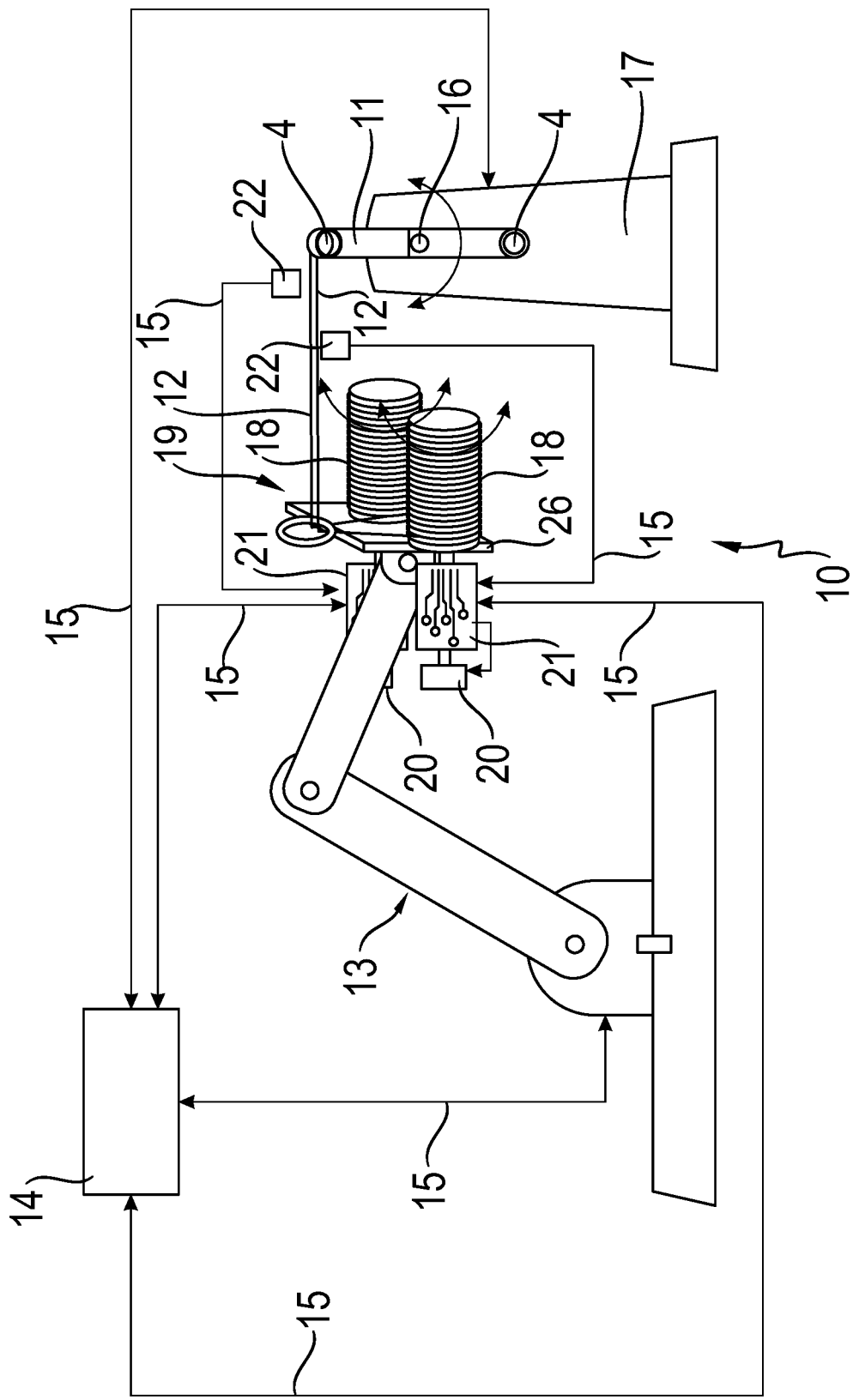
FIG. 7 schematically shows an apparatus for the parallelized laydown of two fiber strands on one fiber carrier.

FIG. 7 schematically shows the apparatus 10 in an embodiment form which is configured for parallelized laydown of two fiber strands 12 on an individual fiber carrier 11. The receiver 26 carries at least two spools 18 arranged next to one another in a horizontal row. The laydown of the fiber strands 12 is carried out on virtually parallel laydown paths, i.e., with a slight spatial offset of the individual fiber strands, corresponding to the respective winding pattern to be generated. The entire component part 1 is usually made up of different winding patterns which are in turn formed from a plurality of parallel fiber strand paths (winding orbits). Accordingly, the basic principle of construction in these three-dimensional wound component parts 1 is very well suited for a parallelization of the fiber strands 12. In this regard, two or more fiber strands 12 can be laid down in parallel so as to be slightly spaced apart on an individual fiber carrier 11 by a corresponding quantity of devices 19 for maintaining the fiber strand tension. Accordingly, a respective winding pattern can be realized with x parallel fiber strands 12 by x/N winding orbits.

In particular, by combining the embodiment forms shown in FIG. 5 or FIG. 6 with the embodiment form shown in FIG. 7, a multi-dimensional parallelization of the manufacturing process can be achieved, by which the manufacturing speed can be increased in the dimension of the product of the quantity of fiber carriers 11 and the quantity of fiber strands 12.

Figure 8:
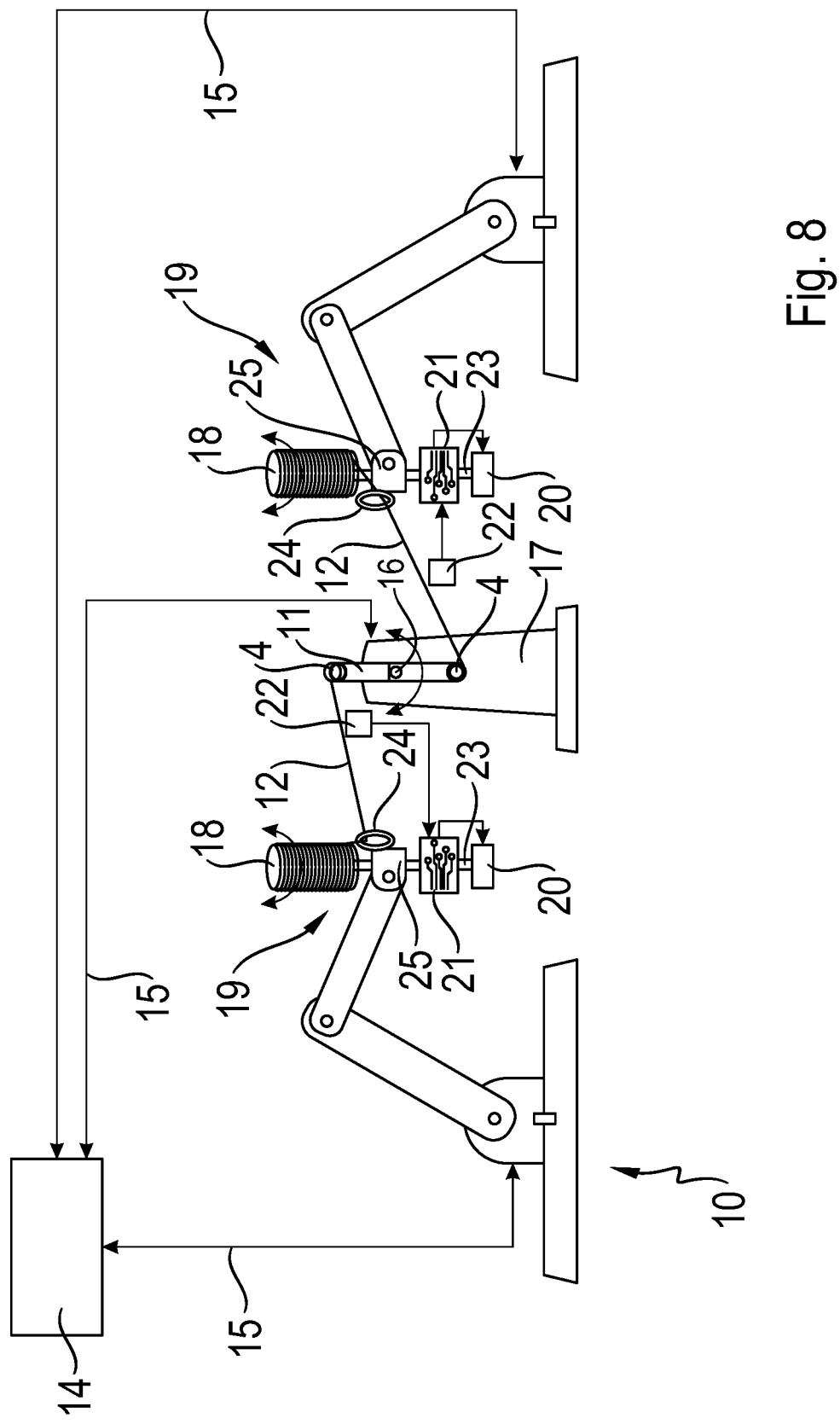
FIG. 8 schematically shows a further embodiment form of an apparatus for the parallelized laydown of two fiber strands on one fiber carrier.

FIG. 8 schematically shows an apparatus 10 for the parallelized laydown of two fiber strands 12 on an individual fiber carrier 11 according to a further embodiment form. In this instance, two robot arms 13 are provided, which robot arms 13 simultaneously wind at least one fiber strand 12 on the one fiber carrier 11 arranged at the pivot mounting 17. The two robot arms 13 are arranged opposite one another so that the pivot mounting 17 is located therebetween. The controller 14 is configured to control the two robot arms 13 for the inverse laydown of at least one fiber strand 12 in each instance on the fiber carrier 11 arranged between the robot arms 13 on the pivot pin 16. By "inverse laydown" on the fiber carrier 11 is meant a simultaneous mirror-inverted or oppositely directed laying down of a respective fiber strand 12 on the one fiber carrier 11 arranged on the pivot pin 16 with respect to the symmetry axis thereof. Accordingly, in the depicted embodiment example, the fiber carrier 11 is wrapped for a component part 1 formed as a four-point link. For example, two load introduction regions 4 located opposite one another are wrapped simultaneously. The same applies for the body 2 of the component part 1. This embodiment example can also be further developed in that a receiver 26 for receiving two or more spools 18 is arranged in each instance at the heads 25 of the robot arms 13. The laydown of the two or more fiber strands 12 by the respective robot arm 13 is carried out in a parallelized manner as was described, for example, referring to the embodiment form according to FIG. 7.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus (10) for manufacturing fiber-reinforced component parts (1) according to a three-dimensional winding method, comprising:
   at least one computer-controlled winding machine configured to wind filiform continuous fiber strands (12) provided on at least one spool (18) around at least one fiber carrier (11), arranged on a pivot pin (16) with at least one winding pattern,
   wherein the at least one winding machine comprises:
      two robot arms (13) each having six rotational axes, said two arms (13) are configured to lay down at least two of the fiber strands (12) simultaneously,
      wherein the two robot arms (13) are configured to simultaneously lay down the at least two fiber strands (12) so as to be distributed to the at least one fiber carrier (11) arranged on a pivot pin (16),
      wherein the pivot pin (16) provides a seventh axis of rotation,
      wherein two robot arms (13) are arranged opposite one another, the two robot arms (13) being configured to provide an inverse laydown of the at least one fiber strand (12), respectively, on the at least one fiber carrier (11) arranged between the robot arms (13) on at least one of the pivot pin pins (16).

2. The apparatus (10) according to claim 1, wherein two fiber carriers (11) are arranged adjacent to one another on the pivot pin (16).

3. A method for generating winding patterns on at least one fiber carrier (11) with an apparatus (10) according to claim 1, wherein an even multiple of parallelized fiber strands (12), and at least two fiber strands (12), are wound onto at least one of the fiber carriers (11) by the apparatus (10).

4. The method according to claim 3, wherein a specifiable fiber strand tension is maintained during the winding process independent from the fiber feed direction of a fiber strand (12) between spool (18) and fiber carrier (11).

5. The method according to claim 4, wherein two rotational axes of each robot arm (13) having a plurality of rotational axes is so controlled during a parallelized laydown of fiber strands (12) in a distributed manner on the at least one fiber carrier (11), the parallelized fiber strands (12) arranged parallel to one another that they are operated with a constant angle during the winding process.

6. The apparatus (10) according to claim 1, wherein the apparatus (10) has at least one device (19) configured to maintain a specifiable fiber strand tension independent from the feed direction of the respective fiber strand (12) between the at least one spool (18) and the at least one fiber carrier (11).

7. The apparatus (10) according to claim 6, wherein the at least one device (19) comprises at least one electronically controlled synchronous motor (20) configured to drive the spool (18).

8. The apparatus (10) according to claim 7, wherein the at least one device (19) further comprises at least one sensor (22) configured to detect the fiber strand tension and at least one computer (21) configured to control the at least one synchronous motor (20) in dependence upon the detected fiber strand tension.

9. The apparatus (10) according to claim 8, wherein the at least one device (19) is connected to a receiver (26) configured to receive the at least one spool (18).

10. The apparatus (10) according to claim 9, wherein at least one spool (18) is arranged at a distance from the two robot arms (13).

11. The apparatus (10) according to claim 9, wherein the at least one spool (18) is arranged at the two robot arms (13).

12. The apparatus (10) according to claim 10, wherein the separate pivot pin (16) on which each fiber carrier (11) is arranged is arranged at the two robot arms (13).

13. The apparatus (10) according to claim 11, further comprising at least one filament eye (24) arranged at each robot arm (13) and configured to provide a substantially frictionless feed of the respective fiber strand.

14. The apparatus (10) according to claim 13, wherein the filiform continuous fiber strands (12) are pre-impregnated semi-finished product, configured as one of: a tow-preg semi-finished product, yarn-preg semi-finished product, uni-tape semi-finished product, and pre-preg semi-finished product.

15. The apparatus (10) according to claim 13, wherein at least one fiber carrier (11) are arranged substantially parallel to another carrier (11) on the pivot pin (16).

* * * * *